United States Patent
Shim

(10) Patent No.: US 10,110,004 B2
(45) Date of Patent: Oct. 23, 2018

(54) POWER MANAGEMENT SYSTEM

(71) Applicant: LSIS CO., LTD., Anyang-si, Gyeonggi-do (KR)

(72) Inventor: Jae Seong Shim, Seoul (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 357 days.

(21) Appl. No.: 14/997,412

(22) Filed: Jan. 15, 2016

(65) Prior Publication Data

US 2016/0268804 A1 Sep. 15, 2016

(30) Foreign Application Priority Data

Mar. 11, 2015 (KR) .................. 10-2015-0033755

(51) Int. Cl.
*H02J 3/32* (2006.01)
*H02J 3/38* (2006.01)

(52) U.S. Cl.
CPC ........ *H02J 3/32* (2013.01); *H02J 3/38* (2013.01); *Y02E 40/10* (2013.01)

(58) Field of Classification Search
CPC ................................ H02J 2/383; H02J 2/386
See application file for complete search history.

(56) References Cited

U.S. PATENT DOCUMENTS

| 8,907,631 | B1 * | 12/2014 | Gurries | H02J 7/0073 307/43 |
| 2010/0231045 | A1 * | 9/2010 | Collins | F01B 21/04 307/47 |
| 2011/0106329 | A1 | 5/2011 | Donnelly et al. | |
| 2012/0256752 | A1 * | 10/2012 | Musser | H02J 7/041 340/636.2 |
| 2013/0024055 | A1 | 1/2013 | Hysko et al. | |
| 2015/0349587 | A1 * | 12/2015 | Gong | H02J 3/32 700/286 |

FOREIGN PATENT DOCUMENTS

| CN | 102887144 A | 1/2013 |
| JP | 2007330083 | 12/2007 |
| JP | 2008-295208 | 12/2008 |

(Continued)

OTHER PUBLICATIONS

Korean Intellectual Property Office Application Serial No. 10-2015-0033755, Office Action dated Nov. 23, 2016, 4 pages.

(Continued)

*Primary Examiner* — Jeffrey Shin
(74) *Attorney, Agent, or Firm* — K&L Gates LLP

(57) ABSTRACT

A power management system is provided. The power management system includes a battery energy storage system (BESS) configured to obtain a state of charge (SOC) information, the state of charge (SOC) information including a charge state of the battery and a charging control unit configured to control charging or discharging of the BESS. The charging control unit is configured to compare a desired SOC and a measured SOC based on the obtained SOC information, and regulate a charging power value of a battery and a discharging power of the battery to match with the desired SOC, when as a result of comparison, the desired SOC and the measured SOC are different from each other.

7 Claims, 4 Drawing Sheets

(56) References Cited

FOREIGN PATENT DOCUMENTS

| | | |
|---|---|---|
| JP | 2013-042598 | 2/2013 |
| JP | 2013-179737 | 9/2013 |
| JP | 2013-179785 | 9/2013 |
| JP | 2014131477 | 7/2014 |
| JP | 2014-239622 | 12/2014 |
| JP | 2015023605 | 2/2015 |
| KR | 10-2008-0021401 | 3/2008 |
| KR | 20120091707 | 8/2012 |
| KR | 10-1337576 | 12/2013 |
| WO | 2011/030380 | 3/2011 |
| WO | 2012131867 | 10/2012 |
| WO | 2014167928 | 10/2014 |

OTHER PUBLICATIONS

Korean Intellectual Property Office Application Serial No. 10-2015-0033755, Office Action dated Mar. 9, 2016, 4 pages.

Japan Patent Office Application No. 2016-025686, Office Action dated Mar. 28, 2017, 3 pages.

Zhu, Ruike; Wang, Yuhong; Li, Xingyuan; Ying, Dali; Zhao, Yan; An Additional Frequency Control Strategy for Interconnected Systems Through VSC-HVDC; Automation of Electric Power Systems; vol. 38; No. 16; Aug. 25, 2014; pp. 81-86.

Office Action for Chinese counterpart application No. CN201610133367.X; dated Jan. 3, 2018; (6 pages).

* cited by examiner

POWER MANAGEMENT SYSTEM

CROSS-REFERENCE TO RELATED APPLICATIONS

Pursuant to 35 U.S.C. § 119(a), this application claims the benefit of earlier filing date and right of priority to Korean Patent Application No. 10-2015-0033755, filed on Mar. 11, 2015, the contents of which are all hereby incorporated by reference herein in its entirety.

BACKGROUND

The present disclosure relates to a power management system, and more particularly, to a power management system that may regulate a battery output according to the state of charge (SOC) of a battery.

As problems, such as destruction of the environment, resource depletion, or the like are posed, an interest in a system that may store power and efficiently utilize the stored power is increasing.

In addition, an interest in utilization of new renewable energy, such as photovoltaic power generation increases, and because such a system uses natural resources that are unlimitedly supplied such as sunlight, wind and tide, there is no pollution in the process of generation and thus a study on its utilization plan is being actively performed.

However, since the power source of new renewable energy, such as wind power generation or photovoltaic power generation essentially depends on the natural environment, there is a characteristic that generation is intermittent. The intermittency leads to a violent fluctuation in power output and as a result, it is possible to cause a decrease in power quality.

In addition, there is a limitation in that the non-uniform generation of a power generation system causes the instability of commercial power.

Control using a battery in order to overcome these limitations is being performed, but due to the characteristic of the battery, the SOC of the battery decreases and the decrease in SOC may make it difficult to perform an energy shift operation (power trade using a new renewable energy source) using the battery.

Also, the battery operates according to a previously made schedule, and there is a case where the SOC of the battery according to the schedule is different from the actual state due to various reasons, which affects the accurate operation of the battery.

SUMMARY

Embodiments provide a system that may regulate the output of a battery based on the state of charge (SOC) of the battery to ultimately enable an operation according to the charging/discharging schedule of the battery.

Embodiments also provide a system that may notify whether to regulate an output of a battery according to the current SOC of the battery based on the past data and lead the regulated output to a less electric charge in the case that the battery output is regulated.

In one embodiment, a power management system includes a battery energy storage system (BESS) configured to obtain a state of charge (SOC) information, the state of charge (SOC) information including a charge state of the battery and a charging control unit configured to control charging or discharging of the BESS. The charging control unit is configured to compare a desired SOC and a measured SOC based on the obtained SOC information, and regulate a charging power value of the battery and a discharging power of the battery to match with the desired SOC, when as a result of comparison, the desired SOC and the measured SOC are different from each other. The charging control unit is configured to raise the charging power value of the battery, when the measured SOC is smaller than the desired SOC during the charging of the battery, and decrease the discharging power value of the battery, when the measured SOC is smaller than desired SOC during the discharging of the battery.

By the battery management of an embodiment as proposed, in the case that the charging or discharging of the battery is performed according to a schedule, and the measured SOC value of the battery is different from a setting, there is an advantage in that it is possible to operate the battery to correspond to the time of the schedule by controlling the sizes of a charging power value for charging the battery and of a discharging power value for discharging the battery.

The details of one or more embodiments are set forth in the accompanying drawings and the description below. Other features will be apparent from the description and drawings, and from the claims.

DETAILED DESCRIPTION OF THE EMBODIMENTS

In the following, embodiments are described in detail with reference to the accompanying drawings.

Figure 1:
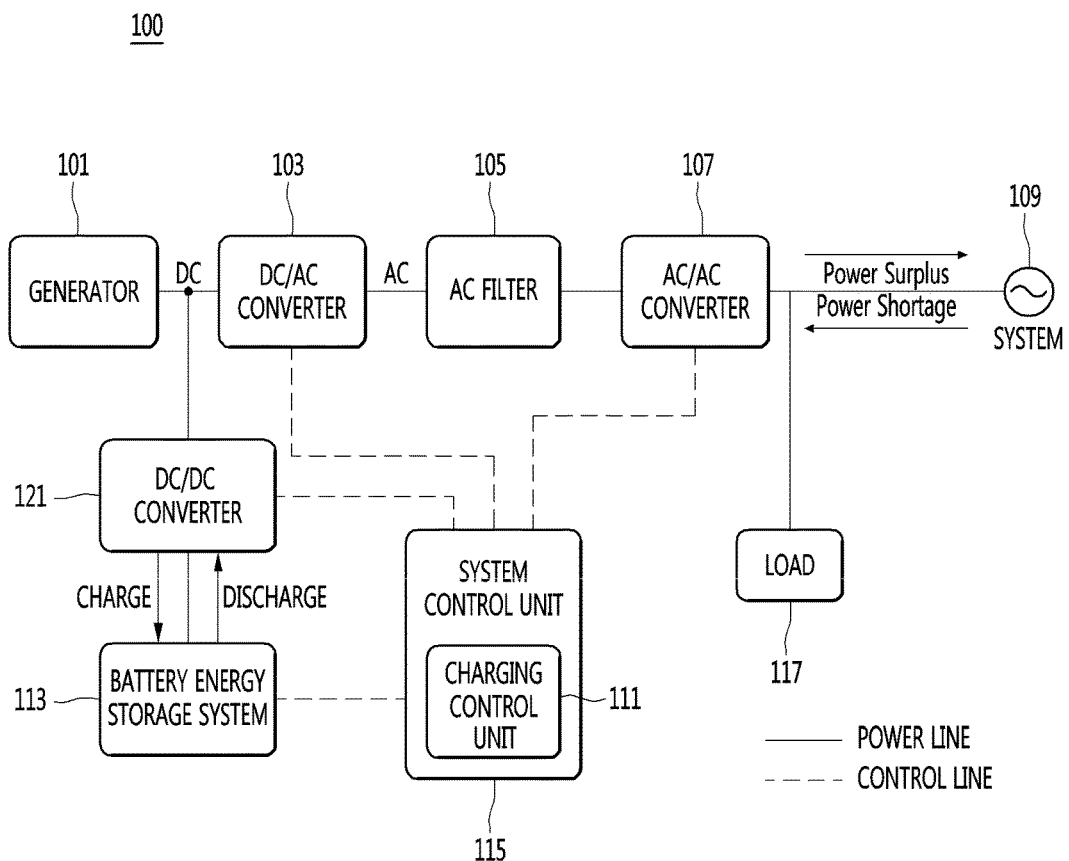
FIG. 1 is a diagram that shows the configuration of a power management system of an embodiment.

FIG. 1 is a diagram that shows the configuration of a power management system of an embodiment.

A power supply system 100 according to an embodiment includes a generator 101, a direct current/alternating current (DC/AC) converter 103, an AC filter 105, an AC/AC converter 107, a system 109, a charging control unit 111, a battery energy storage system 113, a system control unit 115, a load 117 and a DC/DC converter 121.

The generator 101 produces electrical energy. In the case that the generator 101 is a sunlight generation device, the generator 101 may be a solar battery array. The solar battery array may be configured to physically-couple and to electrically connect a plurality of solar battery modules. The solar battery module is a device in which a plurality of solar batteries is connected in series or parallel to convert solar energy into electrical energy to generate a certain voltage and/or current. Thus, the solar battery array absorbs solar energy to convert it into electrical energy. Also, in the case that the generator 101 is a wind power generation system, the generator 101 may include at least a fan that converts wind energy into electrical energy. However, the power management system 100 may supply power through only the battery energy storage system 113 without the generator 101, as described earlier. In this case, the power management system 100 may not include the generator 101.

The DC/AC converter 103 converts DC power into AC power. It receives the DC power supplied by the generator 101 or the DC power discharged by the battery energy storage system 113 to convert the DC power into AC power.

The AC filter 105 filters the noise of power converted into AC power. In a particular embodiment, the AC filter 105 may be omitted.

In order to be capable of supplying AC power to the system 109 or at least one load 117, the AC/AC converter 107 converts the size of a voltage of noise-filtered AC power to supply the converted AC power to the system 109 or an independent load 117. In a particular embodiment, the AC/AC converter 107 may be omitted.

The system 109 is a system that incorporates many power stations, substations, power transmission and distribution lines, and loads to generate and use power.

The load 117 receives electrical energy from the generator 101 to consume power generated by the electrical energy.

The battery energy storage system 113 receives and charges electrical energy from the generator 101 and discharges the charged electrical energy according to the power supply and demand condition of the system 109 or the load 117.

In particular, in the case that the system 109 or the load 117 has a light load, the battery storage system 113 receives and charges idle power from the generator 101. When the system 109 or the load 117 has a heavy load, the battery energy storage system 113 discharges charged power to supply power to the system 109 or the load 117. The power supply and demand condition of the system 109 or the load 117 may have a big difference according to a time zone.

Thus, it is inefficient for the power management system 100 to uniformly supply power supplied by the generator 101 without considering the power supply and demand condition of the system 109 or the load 117. Therefore, the power management system 100 uses the battery energy storage system 113 to regulate an amount of power management according to the power supply and demand condition of the system 109 or the load 117. Accordingly, the power management system 100 may efficiently supply power to the system 109 or the load 117.

The DC/DC converter 121 converts the size of DC power that the battery energy storage system 113 supplies or receives. In a particular embodiment, the DC/DC converter 121 may be omitted.

The system control unit 115 controls the operations of the DC/DC converter 121, the DC/AC converter 103 and the AC/AC converter 107. Also, the system control unit 115 may include a charging control unit 111 that controls the charging and discharging of the battery energy storage system 113.

The charging control unit 111 controls the charging and discharging of the battery energy storage system 113. In addition, the battery energy storage system 113 may check the SOC of a battery and the checked SOC information may be delivered to the charging control unit 111. In addition, when the system 109 or the load 117 has the heavy load, the charging control unit 111 controls at least one of the battery energy storage system 113, the DC/DC converter 121, the DC/AC converter 103, and the AC/AC converter 107 so that the battery energy storage system 113 supplies power to the system 109 or the load 117. When the system 109 or the load 117 has the light load, the charging control unit 111 enables the battery energy storage system 113 and the DC/DC converter 121 to supply power generated from an external power management source or the generator 101 to the battery energy storage system 113.

In the power management system 100 that has the above-described configuration, it is possible to more accurately make a power management schedule that needs to be submitted in a power market. For example, it is possible to make a schedule based on data on how the SOC varies when a battery supplies (outputs) certain power at the current temperature of the battery based on the current SOC level.

A power market structure is roughly discussed with reference to FIG. 2.

Figure 2:
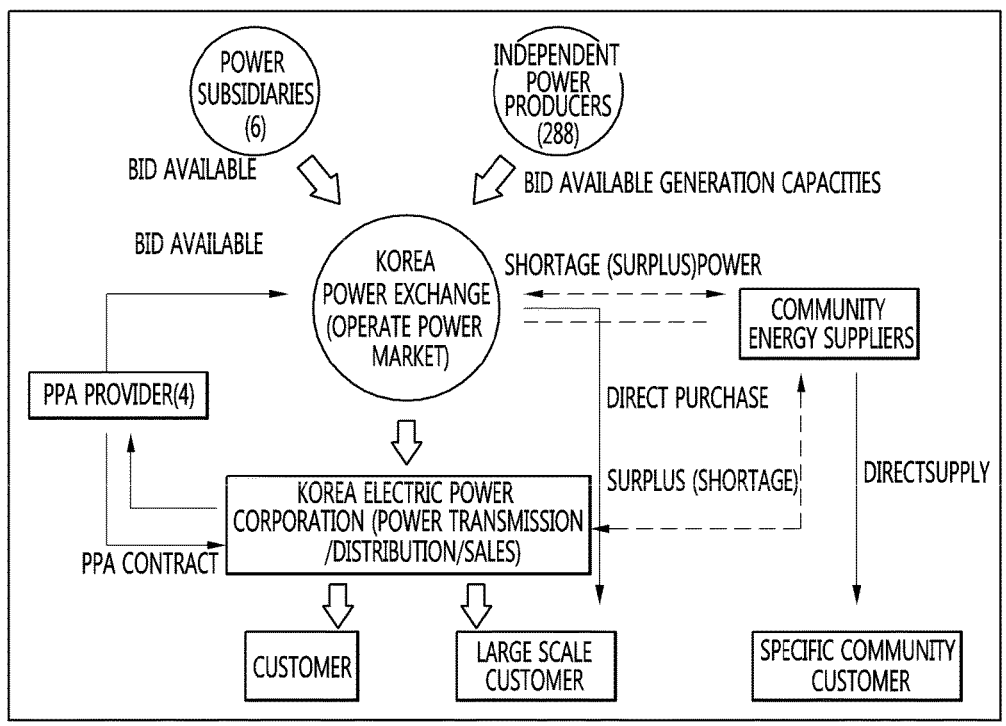
FIG. 2 is a diagram for roughly explaining a power market structure according to an embodiment.

FIG. 2 is a diagram for roughly explaining a power market structure according to an embodiment.

Referring to FIG. 2, the power market structure is roughly divided into a power generation company, an independent power generation company, a power purchase agreement (PPA) business operator, a zone electricity business operator, Korea power exchange, Korea electric power corporation (KEPCO), a consumer, large-scale consumers, and a specific zone consumer.

The power generation company, the independent power generation company, the PPA business operator, and the zone electricity business operator may mean power generation companies, may bid for a suppliable capacity according to an amount of power that a power generation device owned by each may generate, through the Korea power exchange, and make a profit benefit according to the bidding.

The domestic power generation company includes six power generation corporation owned generation companies separated from KEPCO, and 288 independent power generation companies.

The power generation company and the independent power generation company bid for suppliable generation according to a generator that they own, through Korea power exchange everyday. The Korea power exchange is responsible for the operations the power marker and the system in a neutral position.

The KEPCO purchases power at a cost determined in the power market and supplies the purchased power to a consumer. That is, the KEPCO is responsible for power transmission, distribution and selling.

The PPA business operator means a power purchase agreement business operator and bids for a suppliable capacity through the power market but calculation is performed so that a power transaction cost is applied according to a supply and demand contract with the KEPCO, not the amount determined in the power market.

The zone electricity business operator is a business operator that has a power generation facility of a certain scale, produces power with the power generation facility and directly sells the power in a permitted specific zone. Also, the zone electricity business operator directly purchases shortage power from the KEPCO or power market or sell surplus power to the KEPCO or power market.

In this example, the large-scale consumer that needs a contract demand of 30,000 kW or more may directly purchase corresponding power in the power market, not through the KEPCO.

Figure 3:
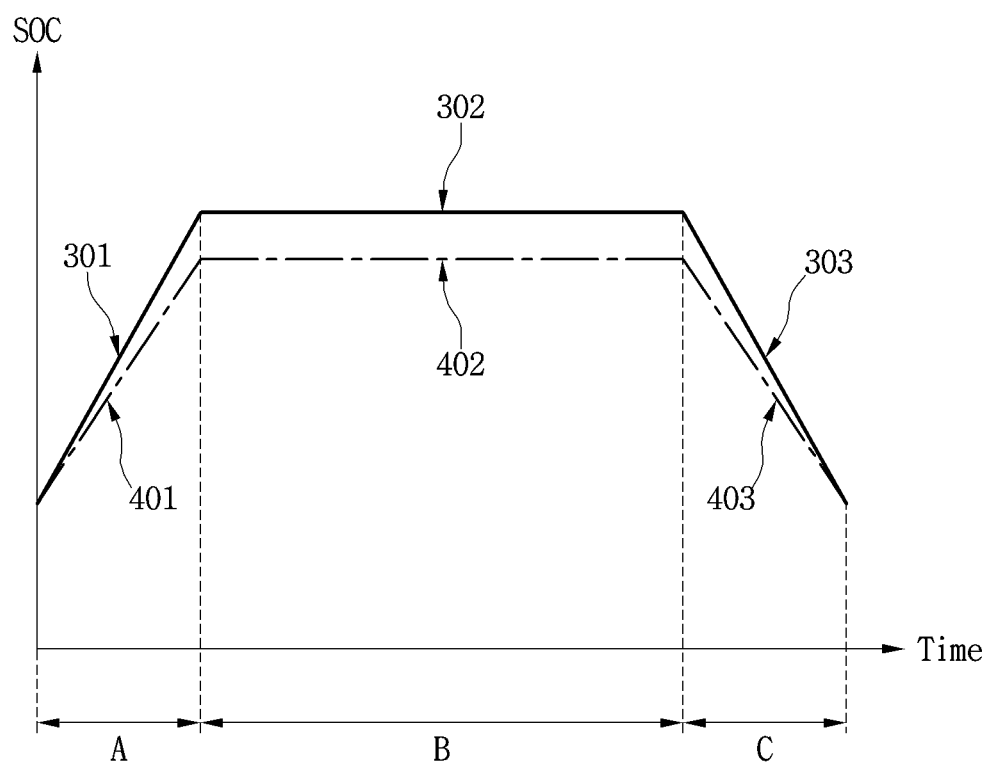
FIG. 3 is a graph that shows an example where there is a difference between a state of charge (SOC) management schedule according to a time and the actual SOC.
Figure 4:
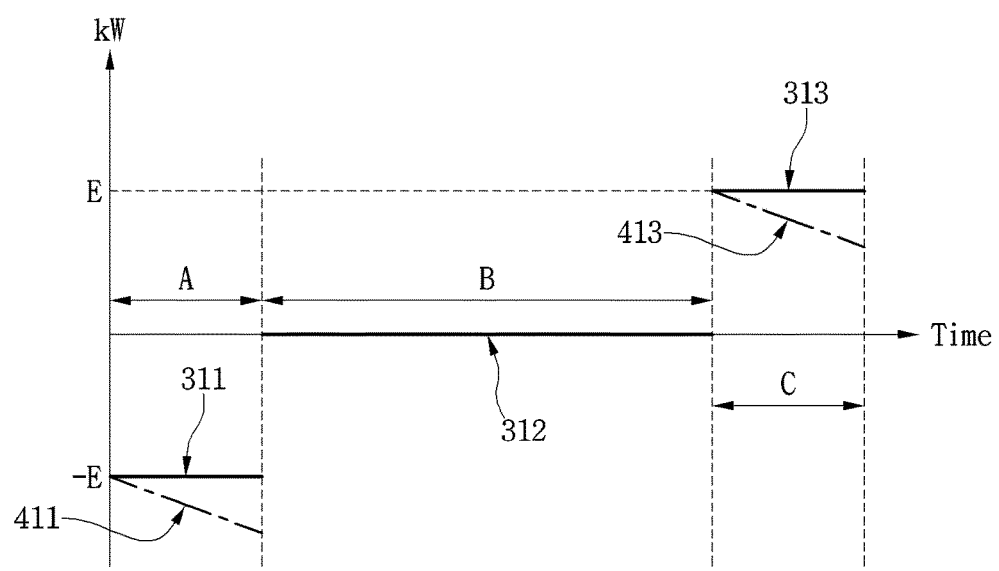
FIG. 4 is a graph for explaining battery discharging and charging control according to the SOC management schedule in FIG. 3.

FIG. 3 is a graph that shows an example where there is a difference between an SOC management schedule according to a time and the actual SOC, and FIG. 4 is a graph for explaining battery discharging and charging control according to the SOC management schedule in FIG. 3.

Referring to FIGS. 1 and 3, the power management system 100 schedules the SOC of the battery in order to supply the power of the battery to the load 117, discharges the battery accordingly, and charges the battery in a time zone in which electric charge has a low cost.

As such, the scheduled SOC information may be obtained by the battery energy storage system 113. The SOC information may include charging scheduling information and discharging scheduling information. The charging scheduling information or the discharging scheduling information may vary according to the temperature of the battery, but is not limited thereto.

For example, the charging, discharging or standby state of the battery is previously scheduled as in cases corresponding to reference numerals 301 to 303 in FIG. 3.

However, although the charging or discharging management of the battery is scheduled and an operation is performed accordingly, there is a case where the actual SOC of the battery is different from prediction.

Firstly, an example is provided in which the scheduled battery management is divided into a battery charging section, a battery maintenance section, and a battery discharging section, and these sections are sequentially performed.

For example, in section A, the battery is charged and the SOC of the battery linearly increases with a first slope 301, in section B, the SOC of the battery is maintained, and in section C, the battery is discharged and the SOC of the battery linearly decreases with a second slope 303.

According to such a schedule, the process of supplying the power of the battery to the load 117 or receiving power from a renewable energy source to charge the battery is performed.

In order to perform battery management according to such a schedule, the charging control unit 115 controls the battery energy storage system 113 to regulate a charging power value for the charging of the battery or regulates the discharging power value for the discharging of the battery.

In the section A, the charging control unit 115 controls the battery to be charged in order to increase the SOC value and controls the DC/DC converter 121 to charge the battery to be a power value of E as shown in FIG. 4.

In addition, in the section B, the charging control unit 115 prohibits the battery from becoming charged or discharged so that the SOC value of the battery is maintained. That is, in the section B, the charging power value or discharging power value delivered to the battery becomes zero.

In addition, in the section C, the charging control unit 115 controls the DC/DC converter 121 to discharge the battery in order to lower the SOC value through the battery discharging. In addition, in the case that a schedule is performed so that the SOC of the battery linearly decreases, the output power value of E of the battery is maintained as shown in FIG. 4.

However, although such battery management is performed, there is a case where the battery does not reach a desired SOC value or the increase or decrease of the SOC is not performed according to a desired slope. The fact that the SOC of the batter is not accurately controlled to have a desired value ultimately means that the management and operation of the battery are not performed according to a schedule, and in order to prepare for such a case, the charging control unit 115 compares the scheduled SOC value with a measured SOC value and controls the charging power value and discharging power value of the battery according to a result of comparison. The measured SOC value is a measurement value.

Specifically, in the section A in FIG. 3 in which the SOC value linearly increases through the charging of the battery, the SOC does not increase along straight line 301 that indicates a desired SOC value but increases along straight line 401 smaller than that as a result of checking BMS by the charging control unit 115.

In this case, the charging control unit 115 charges the battery to increase a battery charging power value to correspond to the straight line 301 that indicates the desired SOC. In the case that the checked SOC is higher than the desired SOC, it is possible to decrease a power value for battery charging.

In order to increase the SOC value of the battery to the desired SOC value, the charging control unit 115 gradually increases a charging power value over time in the section A as shown in FIG. 4. In this case, at a time when the charging schedule of the battery ends, the desired SOC and the measured SOC may be the same. In the case that a battery charging power value increases to reach the desired SOC in the section A, the charging control unit 115 may charge the battery so that the battery has power higher than the scheduled charging power value of E kW.

In addition, the charging control unit 115 refers to past data when determining a regulated charging power value and a regulated slope. It is possible to determine a value that increases or decreases the charging power value of the battery, in consideration of an electric charge consumed when the battery is charged to have a higher power value, and with reference to past data (e.g., the SOC value of the same date and time zone last year)

Also, although FIGS. 3 and 4 show that equally modified battery management is applied to whether to charge the battery, whether to discharge the battery, and all sections in which the charging and discharging of the battery are not performed, it is possible to further maintain the charging of the battery at the early stage of the section B in the case that the battery SOC value does not reach the desired value at the interface between sections A and B.

In the case that the battery does not decrease along a desired SOC slope 303 in the section C in which the battery is discharged and discharged power is delivered to a load, e.g., in the case that the SOC decreases along a second slope 303 that represents a scheduled discharging speed, the charging control unit 115 intentionally decreases a discharging power value by the discharging of the battery so that the desired SOD and the measured SOC are the same at a time when the discharging schedule of the battery ends, in the case that it is determined that the SOC of the battery is lower than a preset desired value.

That is, in order to perform the discharging of the battery along a modified discharging speed 403 in FIG. 3, the discharging of the battery is performed so that power lower than a set discharging power value of E kW is discharged, and the desired SOC value is obtained at a time when the section C is completed.

As described earlier, the modified battery discharging speed 413 may refer to past data, linearly decrease or non-linearly decrease along the current SOC level.

By the battery management of an embodiment as described above, in the case that the charging or discharging of the battery is performed according to a schedule, and the measured SOC value of the battery is different from a setting, there is an advantage in that it is possible to operate the battery to correspond to the time of the schedule by controlling the sizes of a charging power value for charging the battery and of a discharging power value for discharging the battery.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A power management system connected to a generator or a battery and supplying power to a load, the power management system comprising:
  a battery energy storage system (BESS) configured to obtain a state of charge (SOC) information, the state of charge (SOC) information including a charge state of the battery; and
  a charging control unit configured to control charging or discharging of the BESS,
  wherein the charging control unit is configured to:
    compare a desired SOC and a measured SOC based on the obtained SOC information, and
    regulate a charging power value of the battery and a discharging power value of the battery to match with the desired SOC, when as a result of the comparison, the desired SOC and the measured SOC are different from each other, and
  wherein the charging control unit is configured to:
    raise the charging power value of the battery when a slope of the measured SOC is smaller than a slope of the desired SOC during the charging of the battery, wherein the charging power value of the battery is increased linearly during the charging of the battery, and
    decrease the discharging power value of the battery when the slope of the measured SOC is smaller than the slope of the desired SOC during the discharging of the battery, wherein the discharging power value of the battery is decreased linearly during the discharging of the battery.

2. The power management system according to claim 1, wherein the SOC information comprises charging scheduling information on the battery and discharging scheduling information on the battery.

3. The power management system according to claim 2, wherein the charging scheduling information and the discharging scheduling information each varies according to a temperature.

4. The power management system according to claim 1, wherein the charging control unit is configured to enable the desired SOC to be a same as the measured SOC at a time when a charging schedule of the battery ends.

5. The power management system according to claim 1, wherein the charging control unit is configured to further maintain the charging of the battery in a case that the measured SOC does not reach the desired SOC at a time when a charging schedule of the battery ends.

6. The power management system according to claim 1, wherein the charging control unit is configured to enable the desired SOC to be a same as the measured SOC at a time when a discharging schedule of the battery ends.

7. The power management system according to claim 1, wherein the generator is at least one of a sunlight generation device, a wind power generation system, a power station, and a renewable energy source.

* * * * *